(12) United States Patent
Rich et al.

(10) Patent No.: US 9,248,464 B2
(45) Date of Patent: Feb. 2, 2016

(54) REMOTE CONTROLLED MOTION ACTIVATED WATER REPELLANT SYSTEM AND METHOD

(71) Applicant: Woodstream Corporation, Lititz, PA (US)

(72) Inventors: Christopher Rich, Leola, PA (US); Thomas J. Daly, Jr., Lititz, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 217 days.

(21) Appl. No.: 13/799,580

(22) Filed: Mar. 13, 2013

(65) Prior Publication Data

US 2014/0263687 A1 Sep. 18, 2014

(51) Int. Cl.
*B05B 12/02* (2006.01)
*B05B 12/12* (2006.01)
*B05B 15/10* (2006.01)
*A01M 29/30* (2011.01)
*A01M 31/00* (2006.01)

(52) U.S. Cl.
CPC ............ *B05B 12/02* (2013.01); *A01M 29/30* (2013.01); *A01M 31/002* (2013.01); *B05B 12/122* (2013.01); *B05B 15/10* (2013.01)

(58) Field of Classification Search
CPC ... A01G 25/16; A01G 27/003; A01M 7/0089; A01M 31/002; A01M 29/30; B05B 12/004; B05B 12/02; B05B 12/122; B05B 15/10

USPC .............................................. 239/67; 251/65
See application file for complete search history.

(56) References Cited

U.S. PATENT DOCUMENTS

| | | | | | |
|---|---|---|---|---|---|
| 5,009,192 | A | * | 4/1991 | Burman | 119/720 |
| 5,458,093 | A | * | 10/1995 | MacMillan | 119/720 |
| 7,058,479 | B2 | * | 6/2006 | Miller | 700/284 |
| 7,278,375 | B2 | * | 10/2007 | Ross et al. | 119/719 |
| 7,462,364 | B2 | * | 12/2008 | Bell | 424/405 |
| 7,690,146 | B2 | * | 4/2010 | Jong et al. | 43/1 |
| 2008/0251602 | A1 | * | 10/2008 | Leggett et al. | 239/69 |
| 2010/0264339 | A1 | * | 10/2010 | Morozumi | F16H 27/06 251/65 |
| 2012/0042771 | A1 | * | 2/2012 | Mcintyre et al. | 91/418 |

* cited by examiner

*Primary Examiner* — Arthur O Hall
*Assistant Examiner* — Juan C Barrera
(74) *Attorney, Agent, or Firm* — Jacobson Holman, PLLC.

(57) ABSTRACT

A motion activated water repellant sprinkler device for repelling animals that can be remotely controlled is provided. When the device is in on mode, the user can remotely adjust the sensitivity setting of the motion detector, set a time period for which the sprinkler will continually spray, and turn off the device so that the user can approach the device without being sprayed. The ability to set a particular time period for continuous sprinkler activity allows the motion activated water repellant sprinkler device to be used not only as an animal deterring device but also as a watering device for grass and other plants.

17 Claims, 8 Drawing Sheets

REMOTE CONTROLLED MOTION ACTIVATED WATER REPELLANT SYSTEM AND METHOD

BACKGROUND OF THE INVENTION

1. Field of the Invention

The present invention is related to the field of animal repelling devices and, more particularly, to a motion activated water repellant sprinkler device that can be remotely controlled.

2. Description of the Related Art

Motion activated water repellant sprinkler devices are used to sense the presence of a moving pest animal and, upon sensing thereof, to activate and direct a spray of water toward the pest animal in order to drive the animal away.

Figure 1:
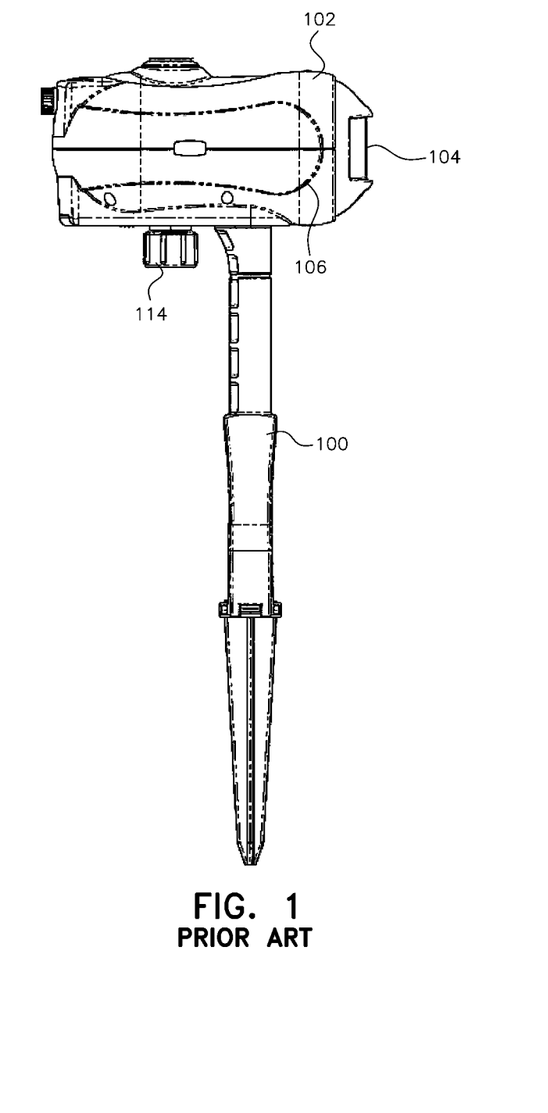
FIG. 1 shows a prior art motion activated water repellant sprinkler device.

A prior art sprinkler deterrent device is shown in FIG. 1 and includes a mounting pole 100 that supports a sprinkler head 102 at the top. The bottom of the pole is typically forced into the ground or otherwise secured to keep the pole steady when the sprinkler head is activated. A motion detector 104 with a control unit 106 is mounted to the pole 100. The control unit 106 includes various setting elements (not shown) such as a duration setting element, a range setting element, and a time of day setting element. Upon detection of motion within the established range, the motion detector 104 sends a signal to the control unit 106 to open a water control valve (not shown) positioned between a hose connection 114 and the sprinkler head 102, allowing water to flow to the sprinkler head 102 and initiate spraying action. A sprinkler deterrent device operating essentially in this manner is disclosed in U.S. Pat. No. 5,009,192 ("the '192 patent"), the disclosure of which is hereby incorporated by reference as if fully set forth herein.

The device in the '192 patent includes a sprinkler with a connection line to a water supply and a low voltage electrically operated shut-off valve in the connection line. An infrared proximity sensor, upon sensing the presence of a moving object, such as an animal, opens the shut-off valve in the connection line to turn on the sprinkler. The sprinkler, which is preferably a pulse type sprinkler, produces a series of pulse sprays to frighten or startle the animal causing it to move away. Sprinkler devices of the type disclosed in the Burman patent may be used to protect shrubbery, flowers, vegetable gardens, farm crops, etc.

When using an infrared (IR) sensor to detect motion in the area covered by the sprinkler, the sensitivity of the IR sensor is typically adjusted manually by the user while standing next to the device. The user is then required to walk 20-30 feet away from the device and then move within the sensor's monitored area to see if the spraying action is activated as desired. If not, the user walks back to the device, readjusts the sensitivity to a different setting, and repeats the checking procedure of moving a distance away from the device and then moving within the sensor's monitored area to determine whether the sprinkler activates appropriately. This procedure is repeated as often as necessary until the correct sensitivity setting is identified.

To disable the sprinkler, the user customarily must manually turn the device off. This is often disadvantageous in that it can be very difficult to approach the sprinkler and turn it off without being sprayed.

Therefore, a need exists for a motion activated water repellant sprinkler device that overcomes the above difficulties.

SUMMARY OF THE INVENTION

In view of the foregoing, the present invention is directed to a motion activated water repellant sprinkler device for repelling animals that can be remotely controlled to activate the device, adjust the sensitivity setting, and deactivate the device.

The motion activated water repellant sprinkler device according to the present invention also includes a sprinkler mode in which the sprinkler may be turned on with a manual or remote command, i.e., without requiring the detection of motion. In sprinkler mode the sprinkler will remain on indefinitely or for a preset time period as determined by the user. Being able to preset a specific time period allows the motion activated water repellant sprinkler device to be used not only as an animal deterring device during set periods but also as a water sprinkler for grass, shrubs, etc.

In view of the foregoing, one object of the present invention is to overcome the difficulties encountered when setting a motion activated water repellant sprinkler device to the desired degree of sensitivity and when deactivating/reactivating the device by enabling these functions to be remotely controlled.

Another object of the present invention is to provide a motion activated water repellant sprinkler device in accordance with the preceding object that includes a sprinkler mode in which the device can be turned on with a remote command and remain on indefinitely or for a preset time period.

A further object of the present invention to provide a motion activated water repellant sprinkler device in accordance with the preceding objects in which a remote control unit is used that communicates with the sprinkler device using an infrared (IR) signal.

A still further object of the present invention to provide a motion activated water repellant sprinkler device in accordance with the preceding objects in which the device also includes manual control capability.

Yet another object of the present invention to provide a motion activated water repellant sprinkler device in accordance with the preceding objects in which water flow to the device is turned on and off using a motor and cam valve control system in which the motor rotates the cam to open and close a water control flow valve which activates and deactivates spraying action of the sprinkler device, respectively.

Still another object of the present invention to provide a motion activated water repellant sprinkler device in accordance with the preceding objects in which rotation of the cam controls the positioning of a permanent magnet, the water flow being turned on when the magnet pulls back a metal plunger in the water flow control valve to open the valve, the metal plunger being released to close the water flow control valve when the cam is further rotated and the magnet is thereby repositioned.

Another object of the present invention to provide a motion activated water repellant sprinkler device in accordance with the preceding objects in which once the motor and cam valve control system has opened the water flow control valve, power is not required in order to keep the valve open, thus reducing the power requirement of the present invention over conventional solenoid-operated valves.

Yet another object of the present invention to provide a motion activated water repellant sprinkler device in accordance with the preceding objects that is not complex in structure and which can be manufactured at low cost but yet is efficiently controlled and operated to repel animal pests and also to water a desired area for a set period of time.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiment, specific terminology will be resorted to for the sake of clarity. It is to be understood that each specific term includes all technical equivalents which operate in a similar manner to accomplish a similar purpose.

Figure 2:
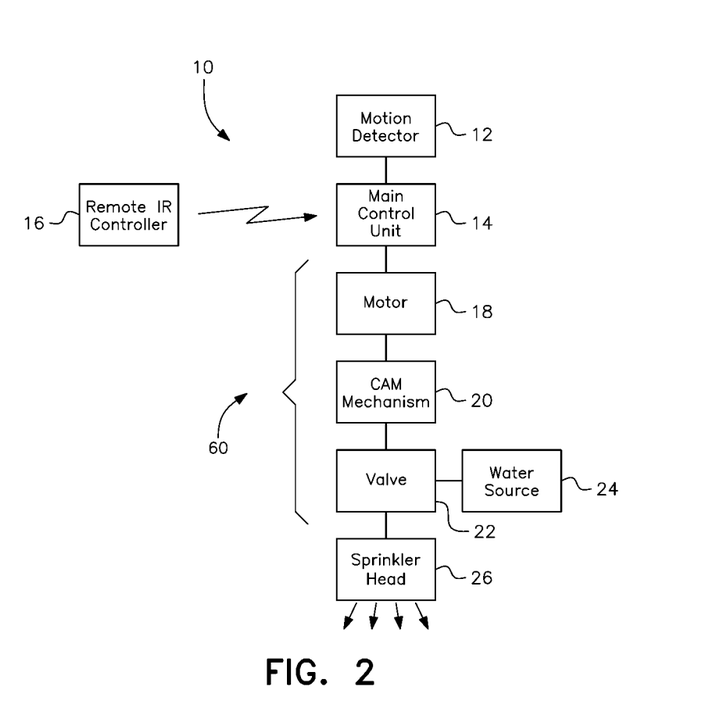
FIG. 2 is a block diagram of the components of the motion activated water repellant sprinkler device in accordance with the present invention.

A block diagram of a motion activated water repellant sprinkler device in accordance with the present invention is shown in FIG. 2. The motion activated water repellant sprinkler device, generally designated by the reference numeral 10, includes a motion detector 12 coupled to a main control unit 14. The main control unit 14 is configured to receive IR control signals from a remote controller 16. When motion is detected, or when a signal is received from the remote controller to turn the sprinkler device on, the main control unit activates a motor and cam valve control system, generally designated by reference numeral 60. The motor and cam valve control system 60 includes a motor 18 which is operative with a cam mechanism 20 and a water flow control valve 22. The motor rotates the cam mechanism to a first position in which the water flow control valve 22 is opened to allow water from a water source 24 to flow to the sprinkler head 26 which generates a water spray. When the device is turned off, the motor rotates the cam mechanism to a second position in which the water flow control valve 22 is closed, shutting off water flow from the water source 24, as will be described further hereinafter.

Figure 3:
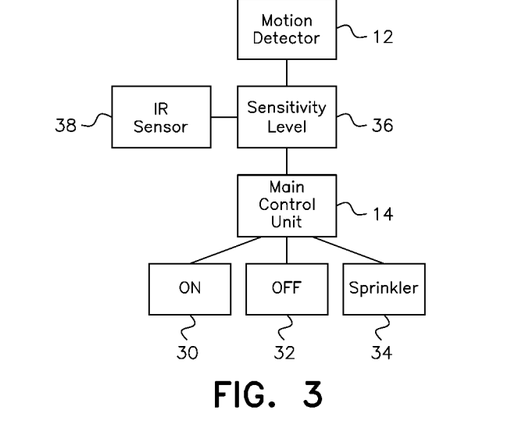
FIG. 3 is a block diagram showing the modes and control components of the main control unit shown in FIG. 2.

As shown in FIG. 3, the main control unit 14 has a plurality of modes which are set manually. According to the illustrated embodiment, these modes include "on" mode 30, "off" mode 32 and "sprinkler" mode 34.

When the main control unit 14 set to "on" 30, the sprinkler device is responsive to commands from the remote controller 16. The remote controller 16 does not have to provide an activation signal in order for the device to begin operation including motion detection and sprinkler activation. The user also does not have to provide a motion detector sensitivity level at the outset using the remote controller because the system defaults to a preset sensitivity level when the main control unit is turned to "on" for the first time. The user, may however, choose to adjust this sensitivity level as is described hereinafter. The user may also adjust the default sensitivity level. According to one embodiment, the device is powered by batteries and the user adjusts the default sensitivity level by removing the batteries and setting the new level. Thereafter, when the main control unit is turned on for the first time after reinsertion of the batteries, the default sensitivity level will be set to the level adjusted by the user.

The remote controller 16 can be used to set the sensitivity level, deactivate and activate the device, and deactivate and reactivate the sprinkler. With the main control unit "on", and in the absence of a deactivation or other command from the remote controller, the device will activate when motion is detected. Deactivation by the remote controller stops motion detection. The remote controller activation command is used only after the device has been deactivated by the remote controller in that, as noted above, the main control unit automatically becomes activated when the main control unit is turned "on".

When the main control unit 14 is manually set to "off" 32, the device is shut down. When shut down, the sprayer 26 and motion detector 12 are turned off and the device 10 is not responsive to any commands sent from the remote controller 16.

Finally, when the main control unit is set to "sprinkler" mode 34, the sprayer 26 is turned on so that water is sprayed indefinitely. However, when in sprinkler mode, the device will respond to sprinkler commands from the remote controller just as when the main control unit is in "on" mode. The sprinkler commands include stop, activate/deactivate, and timer commands. This listing is not intended to be comprehensive as the system may be configured to have additional sprinkler commands. However, with the noted commands the remote controller can be used to stop the sprinkler, as well as to deactivate and reactivate the device, when the main control unit is either in "on" mode or "sprinkler" mode.

Deactivation of the device makes the device unresponsive to motion detection and also turns off the indefinite spraying action initiated by placing the main control unit in sprinkler mode. The device remains responsive to further commands from the remote controller, however.

More particularly, when the device is deactivated using the remote controller, and the main control unit is either in "on" or "sprinkler" mode, the remote controller may thereafter be used to reactivate the device. Therefore, when speaking of the actions that are initiated using the remote controller, the terms "activate" or "reactivate" and "deactivate" are used rather than "on" and "off" because, unless the main control unit itself is manually set to "off", the device remains responsive to commands sent by the remote controller even when deactivated, i.e., the remote controller can reactivate the device. The device is only truly "off", with respect to the ability of the device to respond to remote controller commands, when the main control unit is set to "off".

As is evident, the device may be operated through manual input of a setting at the main control unit and without a remote controller. Setting the main control unit to "on" or "sprinkler", and thereafter controlling the sprinkler device using the remote controller is, however, the preferred configuration of the present invention.

The main control unit 14 has an IR sensor 38 that, when the main control unit 14 is "on" 30, receives and acts upon IR control signals from the remote controller 16. Alternatively, the main control unit could be equipped with an RF receiver that receives RF signals from an RF transmitter at the remote controller.

Figure 4:
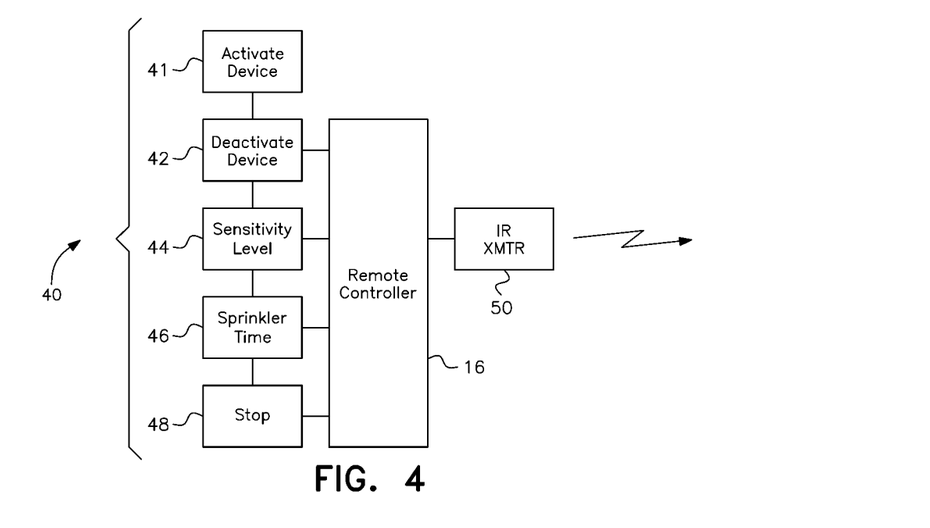
FIG. 4 is a block diagram showing the control elements of the remote controller shown in FIG. 2.

As shown in FIG. 4, the remote controller 16 has a plurality of user input elements generally referred to by reference numeral 40. In the illustrated embodiment, the user input elements 40 are referred to as buttons with the understanding that the input elements are not limited to buttons but may be embodied using any known input elements, including but not limited to buttons, switches, rotary dials, rheostats, a touch screen, etc.

In the illustrated embodiment, the user input elements include a device activation button 41, a device deactivation button 42, a sensitivity level button 44, a sprinkler time set button 46 and a stop button 48. In response to inputs received from the user using these buttons, the remote controller 16 uses an associated IR transmitter 50 to send an appropriate IR command signal to the main control unit 14 of the sprinkler device 10.

The device deactivation button 42 is used to deactivate operation of the device remotely. Being able to remotely deactivate the device allows the user, or other persons or animals in the area, to approach or move in front of the sprinkler device 10 without the risk of being sprayed. The device activation button 41 is used to remotely reactivate the device. A single toggle type button or switch may alternatively be used to deactivate and reactivate the device. As explained above, the device may only be "reactivated" using the remote controller when the manual setting at the main control unit is in the "on" or the "sprinkler" mode.

The sensitivity level button 44 enables the user to set the sensitivity of the motion detector to motion. In the illustrated embodiment, the settings are designated by a range of 1-9, with 9 being the most sensitive setting. Other ranges could, of course, be established.

With the remote controller 16, the user can select and, as necessary, adjust a sensitivity setting without having to walk back and forth from the device 10 to a motion test location. For example, the user may first select sensitivity setting "2" and then can walk around to see how much motion or what speed of motion is needed to activate the sprinkler device 10. If, in the user's view, too much motion or motion speed is required to activate the sprinkler device, the user can simply select a higher sensitivity setting, such as "8", and repeat the test process. If sensitivity setting "8" proves to be too sensitive, e.g., activating the sprinkler device in response to leaf motion, then the user can adjust the setting accordingly. All of these adjustments can be made at a distance from the sprinkler device using the remote controller 16, eliminating the need for the user to have to repeatedly walk up to the unit 10 to select a setting, move away from the unit to test the setting, etc.

The sprinkler time set button 46 allows the user to set a particular time period for which the user wants the sprinkler to remain active, i.e., to spray continually for a set period of time. According to one preferred embodiment, the selectable time periods may be 15 minutes, 30 minutes and 60 minutes. These time periods are only representative, of course, as any time period may be included in the user's choices according to the design of the remote controller 16. For example, the time period could be advantageously controlled using a rotary dial to set any length of time between one minute to two hours. Alternatively, the time could be set by a minute/second window display with a touch screen enabling the user to increase or decrease the set time. Using the sprinkler time set button, the user can employ the sprinkler device 10 as a watering device for plants or as a timed deterrent against encroaching animals.

The sprinkler stop button 48 provides the user with the ability to stop the sprinkler when it has been set with the time set button 46 and the user wants to stop the spraying action before the time period is up.

Figure 5A:
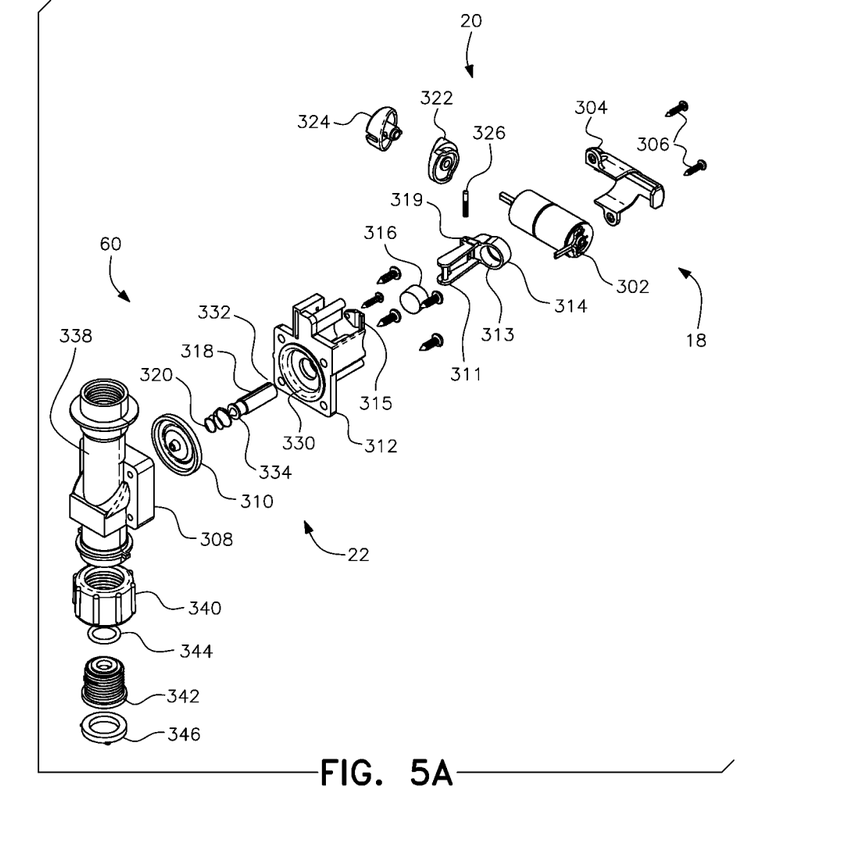
FIG. 5A is an exploded view of the motor and cam valve control system of the present invention.
Figure 5B:
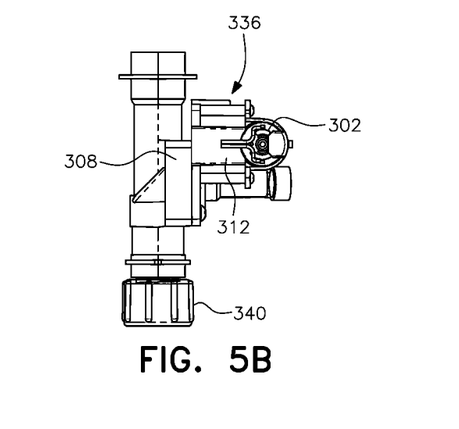
FIG. 5B is an assembled view of the motor and cam valve control system components shown in FIG. 5A.

In the disclosed embodiment, water flow from the water source 24 to the sprinkler head 26 is controlled by the motor and cam valve control system 60, as shown in the exploded view of FIG. 5A and the assembled view of FIG. 5B. Broadly, the motor and cam valve control system 60 includes the motor generally designated by reference numeral 18, the water flow control valve generally designated by reference numeral 22, and the cam mechanism generally designated by reference numeral 20. The water flow control valve 22 is opened and closed by the cam mechanism 20.

Figure 5C:
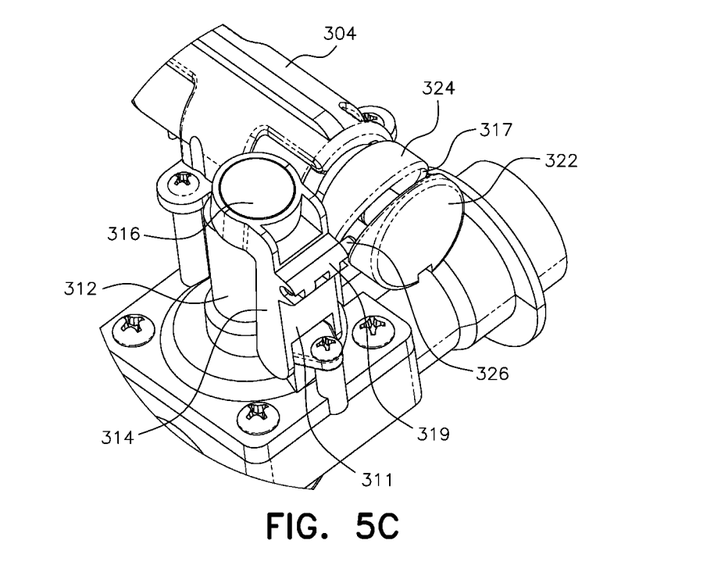
FIG. 5C is a perspective view of the cam mechanism assembled with the magnet and valve arm, which components are shown in FIG. 5A.

The motor includes a motor assembly 302 mounted to a motor bracket 304 with screws 306. The water flow control valve 22 includes a valve manifold 308, a valve diaphragm 310, a valve back housing 312 and a valve arm 314. The valve 22 also includes a permanent magnet 316, and a metal valve plunger 318 with spring 320. The cam mechanism 20 includes a left valve cam 322, a right valve cam 324 and a cam drive pin 326. When the left and right valve cams 322 and 324 are mounted together, as shown in FIG. 5C, they create a curved gap or channel 317 between them. Pin 326, which is mounted in a receiving part 319 on the arm 314, rides in this channel 317 so that, as the motor spins, the arm 314 moves in and out.

The valve diaphragm 310 is positioned between the valve manifold 308 and a central opening 330 in the valve back housing 312. An outer end 332 of the metal plunger 318 is received within the opening 330 in the valve back housing 312, and an inner end 334 of the plunger 318 is seated against the diaphragm 310. The spring 320 is secured to the inner end 334 of the plunger 318 to bias the plunger inwardly. When the valve back housing is secured to the valve manifold 308 to form a valve housing, generally designated by reference numeral 336, the diaphragm 310, plunger 318 and spring 320 are enclosed within the housing 336. As used herein, "outer" and "outwardly" refer to that portion of the motor and cam valve control system nearest the motor, while "inner" refers to the portion of the system nearest the valve manifold 308. The magnet is received within the ring part 313 of the valve arm 314, such as with a press fit. The axle 311 on the inner valve arm 314 is pivotally mounted to the housing 312 using a small clip 315.

The valve housing 336 is mounted on a support structure such as tube or pipe 338. The lower end of the pipe is fitted with a hose coupling 340 and coupling retainer 342 with suitable sealing elements including o-ring 344 and gasket 346. A hose (not shown) may be secured to the hose coupling 340 at one hose end and to a water source 24 at the hose opposite end. The water source 24 may be a city water supply or well that provides water to a dwelling or other building which is then sent through the hose under pressure or other pressurized water supplying configuration.

When the valve 22 is in the closed position and the sprinkler is turned on, either by detection of motion, by the main control unit being placed in "sprinkler" mode or by the remote controller, the motor 18 is activated. The motor rotates the cam mechanism 20 a preset number of degrees in a first direction to a first position and then turns off. In the first position, the cam mechanism positions the permanent magnet 316 in such a way that the magnet pulls back the metal plunger 318 in the water flow control valve to open the valve and allow water to flow through the valve to the sprinkler head 26. When the sprinkler is turned on in response to the detection of motion, the sprinkler will remain on for a preset period of time and then stop. Thereafter, if motion is detected again, the sprinkler will again come on and spray for the preset period of time. When the sprinkler has been turned on by the main control unit being placed in "sprinkler" mode or by the remote controller, water will continue to flow until power is reapplied to the motor in response to receipt of a further command from the remote controller or manual input of a new mode to the main control unit. The motor may be configured to rotate the cam mechanism a preset number of degrees in a second direction to a second position and then turn off. Alternatively, the motor may be configured to rotate the cam mechanism an additional preset number of degrees in the same first direction to reach the second position and then turn off.

In the second position, the magnet 316 is moved outwardly so that the metal plunger 318 is released from the holding force of the magnet. Once released, the plunger moves inwardly under the force of the spring 320 to close the valve and turn off the flow of water to the sprinkler head 26. The cam mechanism rotates only to move the magnet to open and close the valve; thus, movement of the sprinkler head side to side is a function of water pressure and the design of the sprinkler as in the '192 patent.

The motor and cam system 60 as described herein has a low power requirement since the motor is only turned on to rotate the cam mechanism between the opened and closed valve positions. Once the cam mechanism is rotated to open the valve, the motor does not need to continue running in order to maintain spraying action by the device as the magnet keeps the valve open. This is an advantage over conventional solenoid-operated valve control devices which require a constant supply of power to the solenoid to keep the valve open and the sprinkler actively spraying. The low power consumption of the present invention is of particular benefit when the sprinkler is operating in sprinkler mode or when the sprinkler time set input has been used to command the device to spray continually for a set period of time.

According to a preferred embodiment, the motor rotates the cam mechanism 180 degrees to open the valve, and then rotates the cam mechanism another 180 degrees in the same direction to return to the starting position in which the valve is closed. Alternatively, as described above, the system may be configured so that the motor rotates the cam mechanism in two directions, first 180 degrees in one direction to open the valve and then 180 degrees in the opposite direction to close the valve. Greater or lesser degrees of rotation could, of course, be used with appropriate design of the cam mechanism and associated elements.

As would be understood by persons of ordinary skill in the art, the water flow control valve could be opened and/or closed using other mechanisms such as a solenoid or other component(s) as described in the '192 patent. However, the motor and cam valve control system of the present invention is advantageous as this system requires far less power than a conventional solenoid as described above.

Figure 6A:
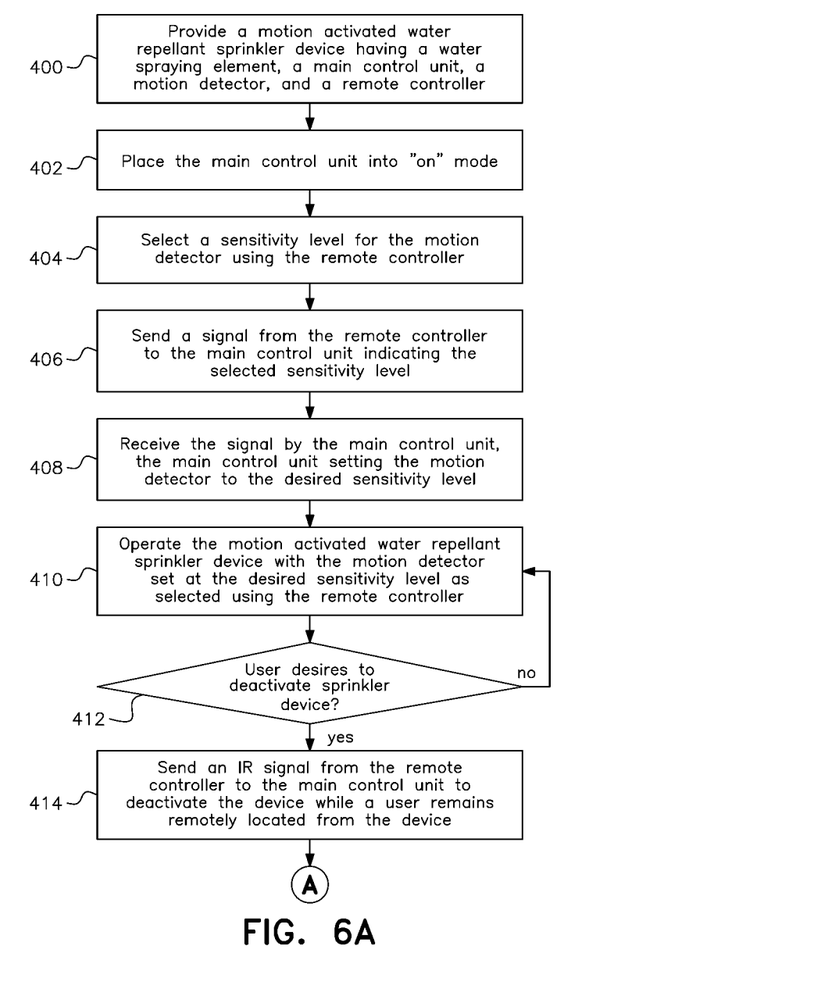
FIG. 6A-6B is a flow chart summarizing the method steps by which a motion activated water repellant sprinkler device in accordance with the present invention is controlled when the device is in "on" mode.
Figure 6B:
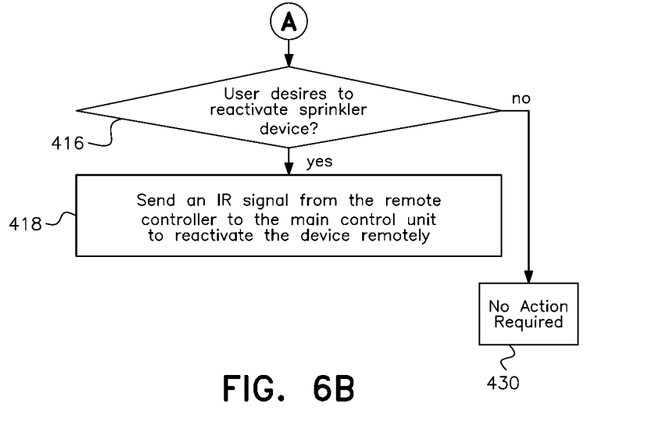
Figure 7:
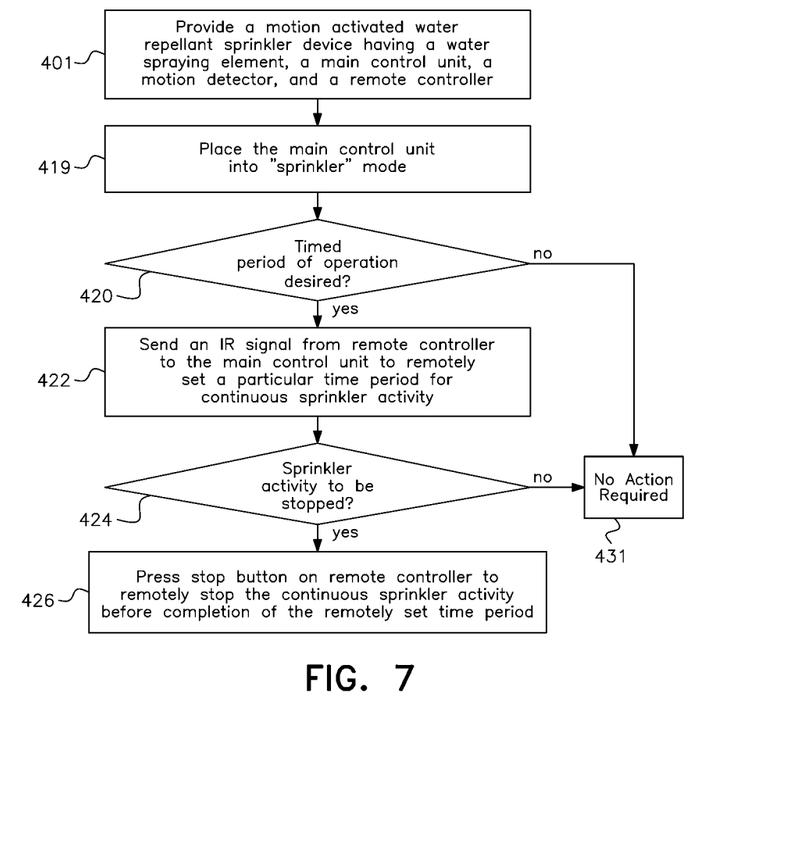
FIG. 7 is a flow chart summarizing the method steps by which a motion activated water repellant sprinkler device in accordance with the present invention is controlled when the device is in sprinkler mode.

As summarized in the flow charts of FIGS. 6A and 6B and FIG. 7, the present invention also includes a method of remotely controlling a motion activated water repellant sprinkler device. The method includes providing a device having a water spraying element, a main control unit, a motion detector and a remote controller, step 400. The water spraying element of the device is connected to a water source through a water flow control valve. The valve is controlled by the motor and cam valve control system 60. The main control unit of the device is operative to initiate opening and closing of the water flow control valve to control water flow to activate and deactivate spraying action. The motion detector of the device is coupled to the main control unit and, when motion is sensed in a monitored area adjacent the sprinkler device, the motion detector sends a signal to the main control unit. In response to the motion detector signal, the main control unit initiates activation of the water spraying element through opening of the water flow control valve. The remote controller is configured to enable the user to deactivate and reactivate the device when the main control unit is "on" or in "sprinkler" mode, and also to set a sensitivity setting of the motion detector.

The flowchart shown in FIGS. 6A and 6B sets forth the control steps when the device is used as a motion detector activated device. The user places the main control unit into "on" mode, step 402, and using the remote controller, selects a sensitivity level for the motion detector, step 404. The remote controller sends a signal to the main control unit indicating the selected sensitivity level, step 406. When the signal is received by the main control unit, the main control unit sets the motion detector to the desired sensitivity level, step 408. The motion activated water repellant sprinkler device then operates with the motion detector set at the desired sensitivity level as selected by the user using the remote controller, step 410.

If the user wants to deactivate the device, step 412, in order to be able to approach the sprinkler device, for example, the user sends a deactivation signal, which may be embodied as an IR signal, from the remote controller to an IR sensor at the main control unit. Upon receipt of the signal, the main control unit deactivates the device while the user remains remotely located from the device, step 414. Motion detector deactivation may be effected by sending a device deactivation signal from the remote controller or by turning the main control unit off. Once deactivated, the user can approach the device without risk of being sprayed.

If the user desires to reactivate the device, step 416, the user sends a command to the main control unit using the remote controller to reactivate the device remotely, step 418. If reactivation is not desired, step 416, no action is necessary, step 430.

The control steps for operating the device in "sprinkler" mode are summarized in FIG. 7. As in the "on" mode, the method includes providing a device having a water spraying element, a main control unit, a motion detector and a remote controller, step 401. The user places the main control unit into "sprinkler" mode, step 419. If the user wishes to remotely set a particular time period for continuous sprinkler activity, step 420, the user enters a desired time period and sends a signal with this information to the main control unit, step 422. If the user wishes to stop the continuous sprinkler activity before completion of the remotely set time period, step 424, the user activates a stop button on the remote controller, sending a signal to the main control unit to deactivate the sprinkler, step 426. If the user does not want to interrupt continuous sprinkler activity, no action is required, step 431.

As described herein, the present invention provides a motion activated water repellant sprinkler device and method having a main control unit that can be set to allow the device to be remotely controlled. The main control unit includes an IR sensor that receives IR signals from the remote controller. When the main control unit is on, the user can adjust the sensitivity setting of the motion detector, deactivate and reactivate the device, set timed periods during which the sprinkler will spray continually, and stop the sprinkler device using the remote controller.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A motion activated water repellant sprinkler device that can be remotely controlled comprising:
    a water spraying element connected to a pressurized water source through a water flow control valve;
    a main control unit operative to initiate opening and closing of the water flow control valve to control water flow to activate and deactivate spraying action;
    a motion detector for sensing motion in an area adjacent the sprinkler device, the motion detector coupled to said main control unit and configured to send a signal to the main control unit when motion has been detected, said main control unit initiating activation of the water spraying element through opening of the water flow control valve in response to the motion detector signal;
    a motor and cam mechanism coupled between the main control unit and the water spraying element, said main control unit activating the motor to rotate the cam mechanism when motion has been detected;
    a permanent magnet associated with said cam mechanism, rotation of said cam mechanism moving the permanent magnet to a first position adjacent to a metal plunger in the water flow control valve to pull the plunger back with magnetic holding force and open the valve, said plunger being spring-biased to move forwardly and close the valve when released from the holding force of the magnet, further rotation of said cam mechanism moving the magnet to a second position away from the metal plunger so that the plunger, when released from the holding force of the magnet, moves to close the valve under said spring bias; and
    a remote controller configured to enable a user to remotely control one or more functions of the sprinkler device.

2. The motion activated water repellant sprinkler device as set forth in claim 1, wherein said remote controller includes a transmitting element that enables the user to deactivate and reactivate the device from a remote location.

3. The motion activated water repellant sprinkler device as set forth in claim 1, wherein said main control unit includes an IR sensor that receives IR command signals from the remote controller to deactivate and reactivate the device.

4. The motion activated water repellant sprinkler device as set forth in claim 1, wherein said remote controller is also configured to enable a user to remotely set and adjust a sensitivity level of the motion detector.

5. The motion activated water repellant sprinkler device as set forth in claim 4, wherein said main control unit includes an IR sensor that receives IR command signals from the remote controller to set and adjust the sensitivity level of the motion detector.

6. The motion activated water repellant sprinkler device as set forth in claim 1, wherein said remote controller is further configured to enable a user to remotely set a particular time period for continuous sprinkler activity.

7. The motion activated water repellant sprinkler device as set forth in claim 6, wherein said remote controller includes a stop input by which the user can remotely stop the continuous sprinkler activity before completion of the remotely set time period.

8. The motion activated water repellant sprinkler device as set forth in claim 7, wherein said main control unit includes an IR sensor that receives IR command signals from the remote controller.

9. The motion activated water repellant sprinkler device as set forth in claim 1, wherein said main control unit includes an RF receiver that receives RF command signals sent from the remote controller.

10. The motion activated water repellant sprinkler device as set forth in claim 1, wherein the motor is only activated while the valve is being moved between the open and closed positions, the valve, once open, being kept open by the magnet so that no additional power is needed to keep the sprinkler active.

11. The motion activated water repellant sprinkler device as set forth in claim 1, wherein said cam mechanism is rotated 180 degrees to move the magnet to the first position to open the valve, and then is rotated an additional 180 degrees to move the magnet to the second position to close the valve.

12. A method of remotely controlling a motion activated water repellant sprinkler device having a water spraying element connected to a water source through a water flow control valve, a main control unit operative to initiate opening and closing of the water flow control valve to control water flow to activate and deactivate spraying action, a motion detector for sensing motion in an area adjacent to the sprinkler device, the motion detector coupled to said main control unit and configured to send a signal to the main control unit when motion has been detected, said main control unit initiating activation of the water spraying element through opening of the water flow control valve in response to the motion detector signal, a motor and cam mechanism coupled between the main control unit and the water spraying element, a permanent magnet being associated with said cam mechanism, said main control unit activating the motor to rotate the cam mechanism when motion has been detected, rotation of said cam mechanism moving the permanent magnet to a first position adjacent to a metal plunger in the water flow control valve to pull the plunger back with magnetic holding force and open the valve, said plunger being spring-biased to move forwardly and close the valve when released from the holding force of the magnet further rotation of said cam mechanism moving the magnet to a second position away from the metal plunger so that the plunger is released from the holding force of the magnet and moves to close the valve under said spring bias, and a remote controller, the method comprising the steps of:
    positioning the sprinkler device in a selected location and coupling the device to a pressurized water supply;
    placing the device into on mode at the main control unit rendering the motion detector active at a preset sensitivity level;
    adjusting, if a different sensitivity level is desired, a sensitivity level for the motion detector using the remote controller;
    sending a signal from the remote controller to the main control unit indicating the selected sensitivity level;
    receiving the signal by the main control unit, said main control unit setting the motion detector to the desired sensitivity level;
    operating the motion activated water repellant sprinkler device with the motion detector set at the desired sensitivity level as selected using the remote controller;
    in response to detecting motion, said main control unit activating the motor to rotate the cam mechanism which, in turn, moves the permanent magnet to the first position adjacent to the metal plunger to pull the plunger back with magnetic holding force and open the water flow control valve to activate the water spraying element; and further rotation of said cam mechanism moving the magnet to the second position away from the metal plunger so that the plunger is released from the holding force of the magnet and moves under said spring bias to close the valve and deactivate the water spraying element.

13. The method as set forth in claim 12, wherein said main control unit includes an IR sensor, the method further comprising the step of sending an IR signal from the remote controller to the main control unit to deactivate the device while a user remains remotely located from the device.

14. The method as set forth in claim 12, wherein said main control unit includes an IR sensor, the method further comprising the step of sending an IR signal from the remote controller to the main control unit to remotely set a particular time period for continuous sprinkler activity.

15. The method as set forth in claim 14, wherein said remote controller includes a stop button, said method including the step of a user pressing the stop button to remotely stop the continuous sprinkler activity before completion of the remotely set time period.

16. The method as set forth in claim 12, further comprising the steps of deactivating the device using the remote controller, and then reactivating the device using said remote controller wherein said main control unit remains in said on mode when deactivated by said remote controller.

17. The method as set forth in claim 16, further comprising the step of turning the main control unit into "off" mode, said device being unresponsive to commands sent from the remote controller when said main control unit is in said "off" mode.

* * * * *